(12) United States Patent
Nishio et al.

(10) Patent No.: US 6,330,848 B1
(45) Date of Patent: Dec. 18, 2001

(54) CIRCULAR SAW CUTTING MACHINE

(75) Inventors: Satoru Nishio, Aichi-ken; Kunio Ohno, Aichi-Ken, both of (JP)

(73) Assignee: Kanefusa Kabushiki Kaisha, Niwa-gun (JP)

( * ) Notice: Subject to any disclaimer, the term of this patent is extended or adjusted under 35 U.S.C. 154(b) by 0 days.

(21) Appl. No.: 09/463,584

(22) PCT Filed: May 26, 1999

(86) PCT No.: PCT/JP99/02781

§ 371 Date: Jan. 28, 2000

§ 102(e) Date: Jan. 28, 2000

(87) PCT Pub. No.: WO99/62663

PCT Pub. Date: Dec. 9, 1999

(30) Foreign Application Priority Data

May 30, 1998 (JP) .................................................. 10-166038
Mar. 15, 1999 (JP) .................................................. 11-068238

(51) Int. Cl.⁷ .................................................. B23D 19/00
(52) U.S. Cl. ..................................... 83/62.1; 83/76; 83/74
(58) Field of Search ............................... 83/62.1, 76, 74, 83/591, 665, 666, 676

(56) References Cited

U.S. PATENT DOCUMENTS

| | | | | |
|---|---|---|---|---|
| 3,776,046 | * | 12/1973 | Jone, Jr. ................................. | 83/615 |
| 3,776,079 | * | 12/1973 | Steinberg ............................... | 83/225 |
| 4,024,780 | * | 5/1977 | Patejak .................................. | 83/306 |
| 4,091,315 | * | 5/1978 | Hayashi et al. ........................ | 83/76 |
| 4,262,564 | * | 4/1981 | Kaltenbach ............................ | 83/56 |
| 4,266,276 | * | 5/1981 | Hayashi ................................. | 83/76 |
| 4,376,401 | * | 3/1983 | Borzym .................................. | 83/319 |
| 5,127,297 | * | 7/1992 | Ohnishi et al. ........................ | 83/82 |
| 5,325,751 | * | 7/1994 | Green et al. ........................... | 83/13 |
| 5,974,927 | * | 11/1999 | Tsune .................................... | 83/490 |

FOREIGN PATENT DOCUMENTS 43 43 484  6/1995 (DE).

* cited by examiner

Primary Examiner—M. Rachuba
Assistant Examiner—Kim Ngoc Tran
(74) Attorney, Agent, or Firm—Oblon, Spivak, McClelland, Maier & Neustadt, P.C.

(57) ABSTRACT

In the operation of cutting a metallic work material, if the rotation of an electric motor 21 is reduced by a reduction gear mechanism including a gear mechanism and transmitted to a main shaft 23 and the metallic work material is cut by a circular saw 28 attached to one end of the main shaft, the moment of inertia I (kgf·m·sec²) of the main shaft is set to be more than $F \times (D/2)/[1000 \times 250 \times (N/60)^2]$ while an outside diameter of said circular saw is D (mm), the number of revolution is N (rpm) and a cutting force per tooth as a component of force in tangential direction is F (kgf). By so setting, at the initial cut positions of the work material and in a region in which the number of cutting related teeth Zi is 1.0 or less at the final cut positions, the moment of inertia is high compared with a cutting torque applied to the main shaft by intermittent cutting resistance, so that the rotational variation of the main shaft is very small. Likewise, in a region in which Zi is high, reproduced chatter is suppressed. As a result, cut surface accuracy enhances and the service life of the saw prolongs.

4 Claims, 11 Drawing Sheets

CIRCULAR SAW CUTTING MACHINE

TECHNICAL FIELD

The present invention relates to a circular saw cutting machine and particularly relates to a circuit saw cutting machine for preventing chatter vibration generated by cutting a metallic work material.

BACKGROUND ART

A circular saw cutting machine of this type reduces the rotation of an electric motor through a pulley and a gear mechanism provided in a gear box and transmits the reduced rotation to a main shaft, has a circular saw attached to one end of the main shaft which end protrudes from the gear box, rotates the main shaft at a low speed with a high torque and thereby cuts a metallic work material. Since the circular saw cutting machine uses gears in a rotation transmission section as stated above, the backlash of gears occurs. Due to this, at the start region and end region of cutting a work material for every cutting operation with the circular saw, with the number of cutting related teeth $Z_i$ being in a range of 0 to 1.0, when the saw tooth is bit into and pulled out of the work material, the rotational variation corresponding to the backlash of the gears occurs. Also, with the number of cutting related teeth $Z_i$ being high, a regenerated chatter which is a self-excited vibration in the feed direction of a main body of the machine accompanied by the rotational variation of the gears often occurs. The rotational variation of the gears causes chatter vibration in the circular saw and deteriorates cutting accuracy. At the same time, the damage, failure and the like of a tip shortens the service life of the circular saw. Further, vibration and noise deteriorate working environment.

In a circular saw cutting device designed to prevent such rotational variation of the gears, as shown in, for example, Japanese Utility Model Examined Application Publication No. 62-28334, pressing pieces are provided on both sides of the circular saw, one of the pieces actuating a hydraulic cylinder to thereby apply a frictional force before the start of cutting operation. Thus, cutting operation is started while eliminating the backlash of a power system and the frictional force is removed by a timer during the operation. According to another circular saw cutting device, as shown in Japanese Utility Model Examined Application Publication No. 7-48339, a control shaft is directly coupled to a main shaft, to which a circular saw is attached, through a gear and a braking device is provided at the control shaft. According to this circular saw cutting device, from the start to the end of cutting operation by means of the circular saw, the backlash of the gears of a drive system is suppressed while a braking force is electrically controlled by a solenoid proportional valve, thereby eliminating the chatter vibration of the circular saw during the cutting operation.

The above-stated circular saw cutting device is, however, designed to apply a braking force to the driving system at the start and end of the cutting operation to thereby forcedly eliminate the backlash of the gears and to perform the cutting operation while reducing cutting power. Owing to this, the mechanical structure is complicated and an electric control structure is required, with the result that the machine disadvantageously becomes expensive and the maintenance of the machine requires more labor.

The present invention has been made to solve the above disadvantages. It is, therefore, an object of the present invention to provide a circular saw cutting machine capable of eliminating the chatter vibration of a circular saw during cutting operation to thereby enhance cutting accuracy, prolonging the service life of the circular saw and suppressing the occurrence of noise at low cost.

DISCLOSURE OF THE INVENTION

To obtain the above object, the characteristic in constitution of the first invention lies in a circular saw cutting machine for transmitting the rotation of an electric motor to a main shaft and for cutting a work material by using a circular saw attached to one end of the main shaft, characterized in that if an outside diameter of the circular saw is D (mm), the number of revolution is N (rpm) and a cutting force per tooth as a component of force in tangential direction is F (kgf), a moment of inertia I (kgf·m·sec$^2$) of the main shaft is set at $I \geq F \times (D/2)/[1000 \times 250 \times (N/60)^2]$.

Further, the characteristic in constitution of the second invention lies in a circular saw cutting machine for transmitting the rotation of an electric motor to a main shaft and for cutting a work material by using a circular saw attached to one end of the main shaft, characterized in that a flywheel is attached either directly to the shaft or to a shaft extended from the main shaft; and if an outside diameter of the circular saw is D (mm), the number of revolution is N (rpm) and a cutting force per tooth as a component of force in tangential direction is F (kgf), a moment of inertia I (kgf·m·sec$^2$) of the overall main shaft including said flywheel is set at $I \geq F \times (D/2)/[1000 \times 250 \times (N/60)^2]$.

Further, the characteristic in constitution of the third invention lies in a circular saw cutting machine for transmitting the rotation of an electric motor to a main shaft and for cutting a work material by using a circular saw attached to one end of the main shaft, characterized in that if an outside diameter of the circular saw is D (mm), the number of revolution is N (rpm) and a cutting force per tooth as a component of force in tangential direction is F (kgf), a sum J of moments of inertia (kgf·m·sec$^2$) of main shaft conversion of respective shafts including the main shaft, the respective shafts cooperated with one another in a state in which a backlash is eliminated from the main shaft is set at $J \geq F \times (D/2)/[1000 \times 250 \times (N/60)^2]$.

According to the first, second and third inventions constituted as stated above, power for rotating the main shaft is reduced by power transmission means (a reduction mechanism), such as a V-shaped belt, and transmitted from the pulley of the output shaft of the electric motor to the pulley of the main shaft to which the circular saw is attached. As for the main shaft-side pulley, by using a pulley of a large mass or by attaching a flywheel of a large mass concentric with the pulley, the moment of inertia I (kgf·m·sec$^2$) of the main shaft can be made higher than $F \times (D/2)/[1000 \times 250 \times (N/60)^2]$. The flywheel can be attached either directly to the main shaft or to the extended main shaft.

Further, not only the moment of inertia of the main shaft but also the sum J of the moments of inertia of main shaft conversion of the respective shafts including the main shaft cooperated with one another through the reduction mechanism in a state in which no backlash occurs between the main shaft and gears in a drive system may be set to be higher than $F \times (D/2)/[1000 \times 250 \times (N/60)^2]$. Further, the smaller sum J of either the sum of the moments of inertia of the main shaft in the drive system or the sum of the moments of inertia of main shaft conversion of the respective shafts including the main shaft cooperated with one another through the acceleration/reduction mechanisms in a state in which no backlash occurs between the main shaft and the gears in the driven system may be set higher than $F \times (D/2)/[1000 \times 250 \times (N/60)^2]$.

As stated above, by setting the moment of inertia of the main shaft or the sum of the moments of inertia of main shaft conversion high, it is possible to suppress rotational variation in a region in which the number of cutting related teeth Zi at the initial cut positions arid the final cut positions of the work material is not more than 1.0, by using the circular saw cutting machine in which rotational variation tends to occur. Namely, by setting either the moment of inertia I of the main shaft or the sum J of the moments of inertia of main shaft conversion to be higher than $F \times (D/2)/[1000 \times 250 \times (N/60)^2]$ where F is a cutting force per tooth applied to the main shaft by intermittent cutting resistance, the rotational variation of the main shaft is made very small and the vibration damping of the machine main body becomes greater than the rotational variation. Thus, it is possible to suppress the occurrence of chatter vibration during cutting operation, to greatly enhance cut surface accuracy and to greatly prolong the service life of the saw. Moreover, a regenerated chatter vibration or coupled chatter vibration generated when the number of cutting related teeth Zi is high can be suppressed from occurring by setting the moment of inertia high.

Further, the characteristic in constitution of the forth invention lies in a circular saw cutting machine for transmitting the rotation of an electric motor to a main shaft and for cutting a work material by using a circular saw attached to one end of the main shaft, characterized in that a confining engagement gear string is constituted by arranging three or more odd-numbered intermediate gears forming a loop with a main shaft gear fixed to the main shaft, engaged with one another and simultaneously rotated, the rotation of the electric motor is transmitted to one of the intermediate gears, at least one of the intermediate gears is movable and a load is applied to at least one of the movable intermediate gears, thereby eliminating a backlash of the confining engagement gear string; and if an outside diameter of the circular saw is D (mm), the number of revolution is N (rpm) and a cutting force per tooth as a component of force in tangential direction is F (kgf), a sum J of moments of inertia (kgf·m·sec$^2$) of main shaft conversion of respective shafts including the main shaft, the respective shaft cooperated with one another in a state in which a backlash is eliminated from the main shaft, is set at $J \geq F \times (D/2)/[1000 \times 250 \times (N/60)^2]$.

According to the forth invention constituted as stated above, by attaching a flywheel having a necessary, sufficient moment of inertia to the shaft of at least one of the intermediate gears constituting a confining engagement gear string and applying a load to a movable intermediate gear, the backlash of the gears constituting the confining engagement gear string is eliminated and the sum J (kgf·m·sec$^2$) of the moments of inertia of main shaft conversion of the respective rotary shafts including the main shafts is set to be not less than $F \times (D/2)/[1000 \times 250 \times (N/60)^2]$.

As stated above, by eliminating the backlash of the circular saw drive system and setting the sum J of the moments of inertia of main shaft conversion high, it is possible to suppress rotational variation in a region in which the number of cutting related teeth Zi at the initial cut positions and final cut positions of the work material by the circular saw cutting machine which tends to generate rotational variation is not more than 1.0. Namely, the rotational variation of the main shaft with respect to a cutting force per tooth F applied to the main shaft by intermittent cutting resistance is made very small and the vibration damping of the main body of the cutting machine becomes greater than the rotational variation. Thus, it is possible to suppress the occurrence of chatter vibration during cutting operation, to greatly enhance cut surface accuracy and to greatly prolong the service life of the saw. Further, a regenerated chatter vibration or coupled chatter vibration generated when the number of cutting related teeth Zi is high can be suppressed from occurring by setting the moment of inertia high.

Additionally, by constituting a confining engagement gear string and applying a load to a movable intermediate gear, it is possible to completely eliminate the backlash of the drive system, to obtain the same vibration suppression effect as that in a case of directly coupling the flywheel to the main shaft and to reduce the vibration and noise at low cost. The reduction of the vibration and noise makes it possible to prevent the working environment from deteriorating. Besides, by attaching a flywheel to an intermediate shaft having the high number of revolution, the diameter of the flywheel can be reduced compared with a system in which the flywheel is directly coupled to the main shaft. Also, since the flywheel is not disposed on the main shaft, it is possible to advantageously prevent the wheel and the work material from interfering with each other and to advantageously reduce the mass of the machine.

Moreover, a pressure force can be easily regulated by a pressure regulation valve or the like provided in a hydraulic cylinder circuit. It is also possible to suppress wasteful power consumption and the wearing of gears by applying the pressure force only during cutting operation by using a switching valve and by stopping the application of the pressure force during slipping. Even if the wearing of gears progresses by the use of the machine for along period of time, it is possible to maintain backlash free. Even if a gears is eccentric or there is an error in the shape of a gear, the eccentricity or error is absorbed by the extension of the hydraulic cylinder. Thus, there is no fear that an excessive load acts on the gear surface or bearing. Besides, since it is not necessary to use highly accurate gears, the cutting machine can be manufactured at low cost.

It is noted that backlash herein means not only backlash between gears but also rotational play in the respective rotary shafts within the transmission mechanism in which a rotational variation which is referred to as disadvantage in the present invention is generated.

Now, the basis of the above-stated moment of inertia I (J) will be described.

As is well known, Mathematical Expression 1 below is satisfied for the moment of inertia of the main shaft I (kgf·m·sec$^2$).

$$T = I \times d\omega/dt \qquad \text{[Mathematical Expression 1]}$$

where T (kgf·m) is torque, $\omega = 2\pi(N/60)$ (rad/sec) is the angular velocity of rotation and $d\omega/dt$ (rad/sec$^2$) is angular acceleration.

If the maximum force per tooth when the saw cuts the work material is F (kgf), the variation torque T is expressed by Mathematical Expression 2.

$$T = F \times (D/2)/1000 \qquad \text{[Mathematical Expression 2]}$$

where D (mm) is an outside diameter of the saw. With this torque variation, the number of revolution of the main shaft varies at the above-stated angular acceleration of $d\omega/dt$.

If the related factors are made dimensionless using the Mathematical Expressions 1 and 2, they are expressed by Mathematical Expression 3 below.

$$K = F \times (D/2)/[1000 \times I \times (N/60)^2] \qquad \text{[Mathematical Expression 3]}$$

where K is a constant.

The following Mathematical Expression 4 can be obtained by setting the constant K to be an appropriate value in the Mathematical Expression 3.

$$I \geq F \times (D/2)/[1000 \times K \times (N/60)^2]$$ [Mathematical Expression 4]

That is, by determining an appropriate value as the constant K, the moment of inertia I can satisfy the Mathematical Expression 4. In that case, the rotational variation of gears caused by cutting force is not generated. Here, various types of cutting tests were conducted. As a result, it was clear that if K is not less than 250 and the moment of inertia satisfies the relationship of the Mathematical Expression 4, then the rotational variation of gears caused by cutting force was eliminated. In the present application, K=250 is used as a threshold value. Consequently, as stated above, the vibration damping of the main body of the cutting machine becomes greater than the rotational variation. It is, therefore, possible to suppress the occurrence of chatter vibration during cutting operation, to greatly enhance cut surface accuracy and to greatly prolong the service life of the saw. It is noted that the above-stated relationship is also applied to the moment of inertia J of main shaft conversion.

BEST MODES FOR WORKING THE INVENTION

I. Embodiment 1

Now, description will be given to a case where a constant K is determined by two types of circular saw cutting machines, i.e., a slide type and a swing type as the first embodiment, with reference to the drawings.

Figure 1:
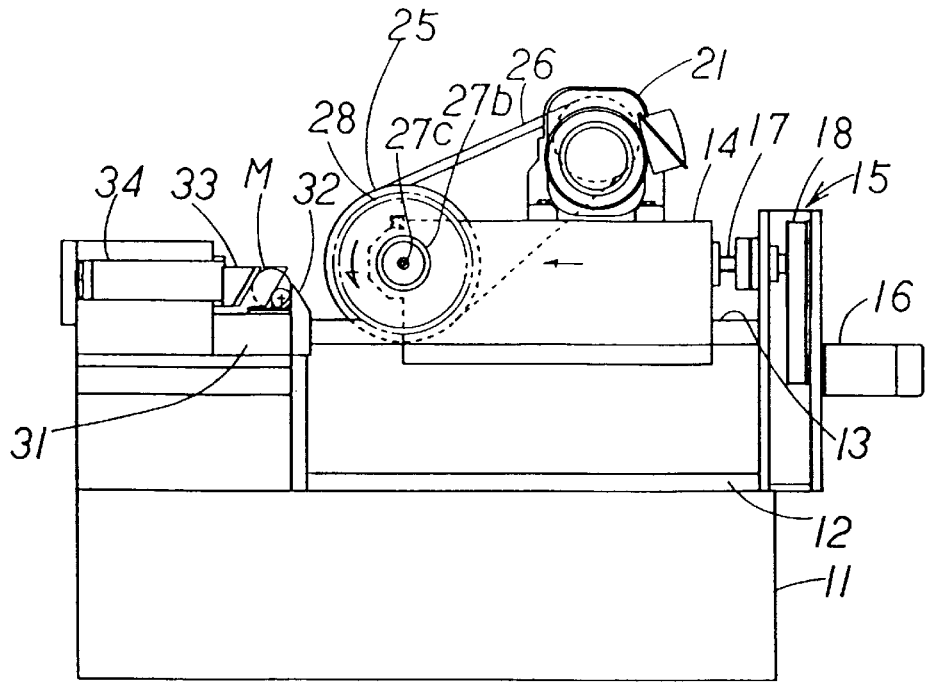
FIG. 1 is a front view schematically showing a circular saw cutting machine A as the first embodiment according to the present invention.
Figure 2:
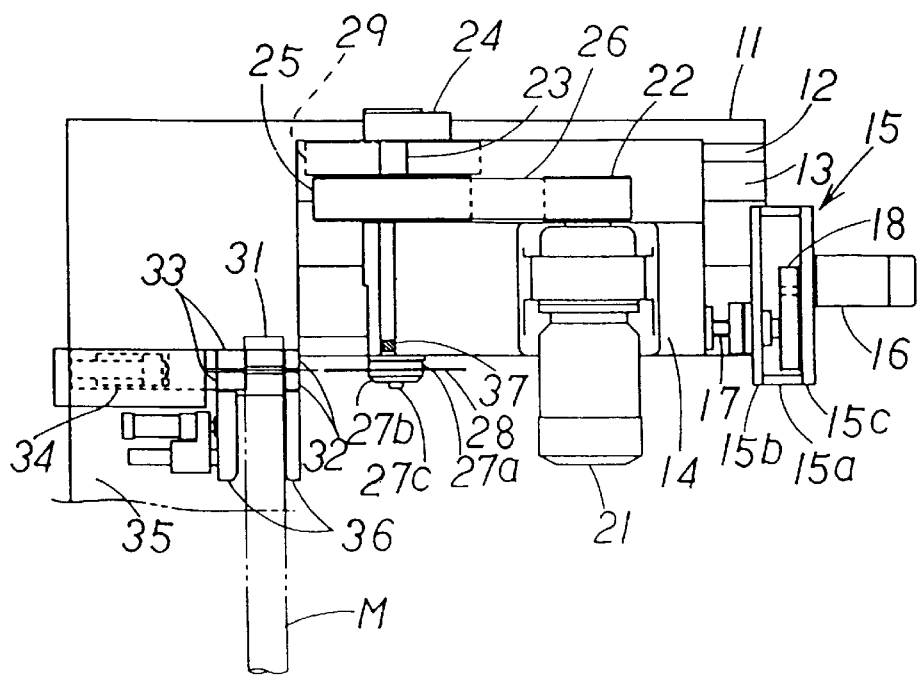
FIG. 2 is a plan view showing the circular saw cutting machine A.

FIGS. 1 and 2 show a slide-type circular saw cutting machine A as a front view and a plan view, respectively. The circular saw cutting machine A is provided with an oblong solid machine base 11. On the right side of the upper surface of the machine base 11, an oblong solid bed 12 is disposed to occupy about two-thirds in crosswise direction (note, the crosswise direction will hereinafter mean a direction seen from the front of the machine base 11). A pair of rails 13 extending in the crosswise direction are provided on the upper surface of the bed 12. An oblong solid movable base 14 is disposed to be slidable crosswise on the bed 12 by fitting a groove (not shown) provided in the bottom of base 14 into the rails 13. A drive support section 15 is fixed to the region from the generally intermediate position to the front side of the right side surface of the bed 12 in longitudinal direction and protrudes from the upper end of the bed 12 to be opposed to the movable base 14.

The drive support section 15 includes a bottom plate 15a and a pair of parallel side plates 15b and 15c provided on crosswise ends of the bottom plate 15a, and is fixed to the bed 12 by the left side plate 15b. A servo motor 16 is fixed to the right of the right side plate 15c with a rotation shaft thereof directed in left direction. A ball screw 17 penetrates and is horizontally fixed to the left side plate 15b. The servo motor 16 and the ball screw 17 are coupled to each other with their respective pulleys (not shown) inserted into a V-shaped belt 18. By doing so, the rotation of the servo motor 16 is converted to a linear motion at the ball screw 17 and the movable base 14 is moved crosswise by the rectilinear propagation force of the ball screw 17.

An electric motor 21 with a reduction gear is fixedly disposed at the right position on the upper surface of the movable base 14 with the rotation shaft thereof directed in backward direction. A drive pulley 22 is attached to the rotation shaft. A main shaft 23 is provided to penetrate the vertically intermediate position on the left end of the movable base 14 in longitudinal direction. The rear end of the main shaft 23 is rotatably supported by a bearing 24 provided on the rear end of the movable base 14. A driven pulley 25 is fixed to a position at which the main shaft 23 protrudes from the back surface of the movable base 14. The driven pulley 25 is set to have a large mass and a high moment of inertia. A V-shaped belt 26 is wound around the drive pulley 22 and the driven pulley 25 to thereby allow the rotational force of the electric motor 21 to be transmitted to the main shaft 23. The main shaft 23 slightly protrudes from the front surface of the movable base 14 and a circular saw with an extremely hard tips (to be referred to as "circular saw" hereinafter) 28 is put between flanges 27a and 27b and fixed to the protrusion end of the main shaft 23 by a fixed bolt 27c Further, an acceleration sensor 37 is provided at the front left end position on the upper side surface of the movable base 14 to allow the acceleration of the movable base 14 in the feed direction in the vicinity of the circular saw 28 to be detected.

As shown in FIG. 2, a vice base 31 for fixing a work material M is disposed at the front left end position on the upper surface of the machine base 11 in contact with the left side surface of the bed 12. The vice base 31 is provided with a right fixed base 32 and a left movable base 33. Grooves through which the circular saw 28 is passed are formed in the fixed base 32 and the movable base in the direction in which the circular saw 28 progresses, respectively. A hydraulic cylinder 34 for moving the movable base 33 is disposed on the machine base 11 in the left direction of the movable base 33.

As shown in FIG. 2, a supply base 35 having a roller for supplying the work material M is provided in front of the vice base 31. The supply base 35 is provided with a sizing device 36 proximate with the fixed base 32 and the movable base 33 for cutting the work material to have a given size. The sizing device 36 feeds a predetermined size of the work material.

In the circular saw cutting device A, if the mass of the driven pulley 25 is small, a flywheel 29 can be fixed to the main shaft 23 in parallel to the driven pulley 25 as indicated by a dotted line of FIG. 2.

Figure 3:
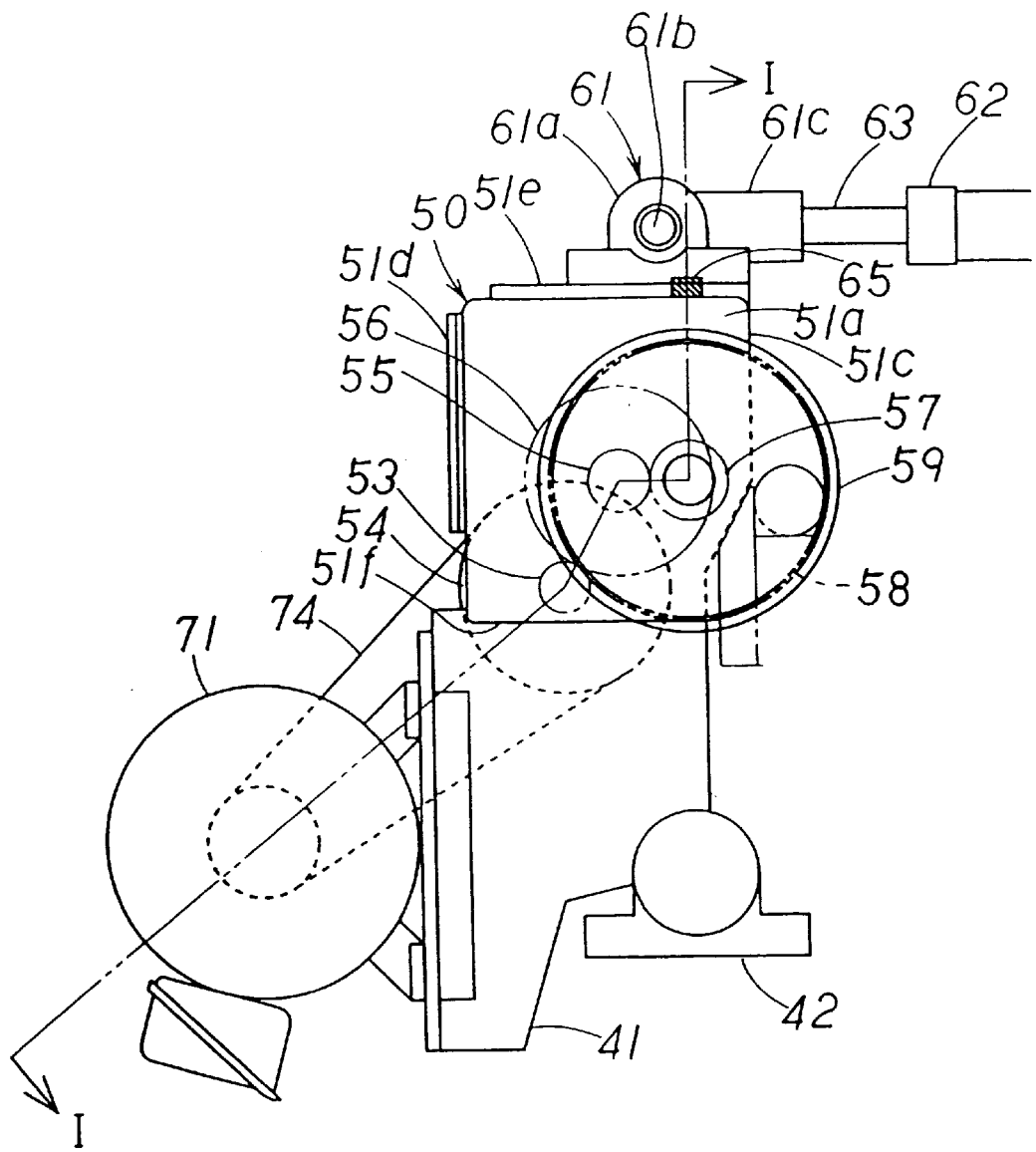
FIG. 3 is a front view schematically showing a circular saw cutting machine B as the first embodiment.
Figure 4:
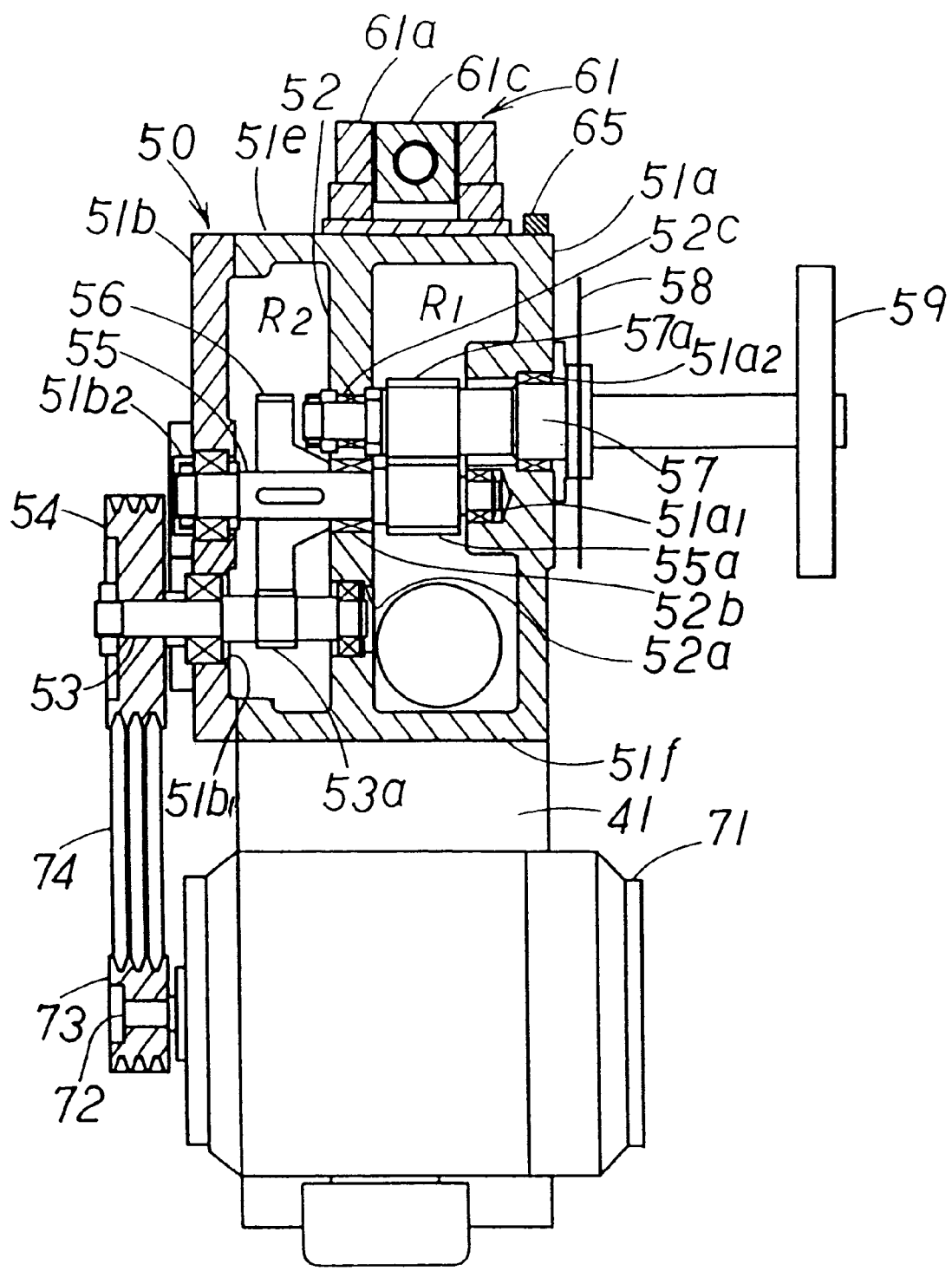
FIG. 4 is a cross-sectional view taken along line I—I of FIG. 3.

Next, description will be given to a swing-type circular saw cutting machine B with reference to the plan view of FIG. 3 and the partially broken sectional view (taken along line I—I of FIG. 3) of FIG. 4.

The circular saw cutting machine B is provided with a box-shaped machine base 41. The machine base 41 is rotatably supported by a support base 42 at the lower right position. A box-shaped gear box 50 is fixedly disposed on the upper portion of the machine base 41. The gear box 50 is a hollow shape surrounded by a front sidewall 54a, a rear sidewall 51b, a right sidewall 51c, a left sidewall 51d, an upper surface wall 51e and a bottom wall 51f (note crosswise direction will hereinafter mean a direction seen from the front of the machine base 41). A partition wall 52 is integrally provided at the intermediate position of the gear box 50 in longitudinal direction and the inside of The gear box 50 is divided into the front side room R1 and the rear side room R2.

Through holes 52a and 51b1 penetrating the partition wall 52 and the rear sidewall 51b in longitudinal direction are formed at central positions in the vicinity of the lower end of a rear side room R2 seen from the front surface side. A rotary shaft 53 is supported by the through holes 52a and 51b1 through a bearing so as to be rotatable and not to be axially movable. One end of the rotary shaft 53 protrudes externally from the rear sidewall 51b and a pulley 54 is fixed to the protrusion end thereof. A pinion 53a is fixedly attached to a portion of the rotary shaft 53 in the rear side room R2.

A through hole 52b penetrating the partition wall 52 in longitudinal direction is provided at the vertically central position of the gear box 50, that is, generally at the upper position of the rotary shaft 53 attached to the gear box 50. Support depressed portions 51a1 and 51b2 are provided in the front sidewall 51a and the rear sidewall 51b, respectively. A rotary shaft 55 is supported by the through holes 52b and the support depressed portions 51a1 and 51b2 through a bearing so as to be rotatable and not to be axially movable. A gear 56 is provided at a position of the rotary shaft 55 which position corresponds to the pinion 53a of the rotary shaft 53 and engaged with the pinion 53a. A pinion 55a is attached to a portion of the rotary shaft 55 in the front side room R1.

Through holes 51a2 and 52c penetrating the front sidewall 51a and the partition wall 52 in longitudinal direction are formed generally at right positions of the rotary shaft 55 of the gear box 50. The main shaft 57 is supported by the through holes 51a2 and 52c through a bearing so as to be rotatable and not to be axially movable. One end of the main shaft 57 protrudes forward from the front sidewall 51a and a circular saw 58 is fixed to the protrude portion of the shaft 57 in the vicinity of the front sidewall 51a to be put between flanges. A disk-shaped flywheel 59 is screwed with the protrusion tip end position of the main shaft 57. A gear 57a is provided at a position of the main shaft 57 which position corresponds to the pinion 55a of the rotary shaft 55 and engaged with the pinion 55a. Many through holes which are not shown are formed in the partition wall 52 in addition to the above-stated through holes to allow the front and rear side rooms R1 and R2 to communicate with each other.

An attachment section 61 is provided on the upper side surface 51e of the gear box 50. The attachment section 61 is provided with a pair of front and back support portions 61a, a rotary shaft 61b rotatably attached to the support portions 61a and a cylindrical shaft 61c attached to the rotary shaft 61b. The tip end of the rod 63 of the hydraulic cylinder 62 fixed to another portion on the right of the circular saw cutting machine is fixedly inserted to the cylindrical shaft 61c. The gear box 50 is pushed by the extension of the rod 63 of the hydraulic cylinder 62 and rotated about the support base 42. An acceleration sensor 65 is attached on the front end of the upper side surface 51e of the gear box 50 and detects the acceleration of the gear box 50 near the circular saw 58 in the feed direction of the box 50.

An electric motor 71 is attached on the left side portion of the machine base 41. A pulley 73 is fixed to a shaft 72 protruding to the back of the electric motor 71. A V-shaped belt 74 is wound around the pulleys 73 and 54. With the V-shaped belt 74 thus wound, the rotation of the electric motor 71 is transmitted to the main shaft 57 through the rotary shafts 53 and 55 to thereby rotate the circular saw 58. The gear box 50 is filled with lubricating oil, which oil circulates in the front and rear side rooms R1 and R2.

Test Result

Description will be given to the results of tests of cutting a work material S45C of ⌀50 mm under the cutting condition of SZ=0.08 mm per tooth while using the above-stated circular saw cutting machines A and B and using five types of circular saws shown below, i.e., C, C1, C2, D and E for a case where a flywheel is attached to the main shaft and a case where no flywheel is attached thereto.

Circular saw C . . . ⌀D 360 mm×T 2.5 mm×Z 60 teeth, grooved tooth type, new tooth Circular saw C1 . . . ⌀D 360 mm×T 2.5 mm×Z 60 teeth, grooved tooth type, worn tooth Circular saw C2 . . . ⌀D 360 mm×T 2.5 mm×Z 60 teeth, grooved tooth type, another worn tooth Circular saw D . . . ⌀D 200 mm×T 1.6 mm×Z 47 teeth, special tooth type, new tooth Circular saw E . . . ⌀D 280 mm×T 2.0 mm×Z 60 teeth, grooved tooth type, new tooth 1. Cutting Test Result if no Flywheel is Attached:

In the circular saw cutting machine A, if no flywheel 29 was attached, the driven pulley 25 was detached and replaced by a pulley having less flywheel effect, the moment of inertia I of the main shaft 23 in the forward rotation direction was 0.001 (kgf·m·sec$^2$) In the circular saw cutting machine B, if both the extension shaft and the flywheel 59 were detached, the moment of inertia I of the main shaft 57 in the forward rotation direction was 0.0001 (kgf·m·sec$^2$). As a result, while a backlash occurred between the main shaft and the other shaft, chatter vibration was generated at the initial and final cut positions in the entire rotation region for all of the above cases. In addition, even in a high Zi region, vibration was high and, in some cases, regenerated chatter vibration or coupled chatter vibration occurred.

2. Cutting Test Result if the Flywheel is Attached:

A flywheel or a pulley having the same effect as that of the flywheel was attached to the main shaft of each of the circular saw cutting machines A and B. Under the conditions, at the initial and final cut positions or the intermediate cut positions, if the lowest number of revolution with which no chatter vibration occurred was Ncr, the result was as shown in Table 1 below. In the Table 1, K is a constant shown in Expression 3 and I is the moment of inertia of the main shaft.

TABLE 1

| condition | | I (kgf · m · sec$^2$) | cicular saw | F (kgf) | Ncr (rpm) | K |
|---|---|---|---|---|---|---|
| 1 | A(flywheel) | 0.633 | C | 89 | 20 | 228 |
| 2 | A(no flywheel) | 0.233 | C | 89 | 35 | 202 |
| 3 | A(no flywheel) | 0.233 | C1 | 105 | 40 | 183 |
| 4 | A(no flywheel) | 0.233 | C2 | 112 | 40 | 195 |
| 5 | B(flywheel smoll) | 0.00801 | D | 65 | 120 | 204 |
| 6 | B(flywheel middle) | 0.0210 | D | 65 | 75 | 198 |
| 7 | B(flywheel large) | 0.0494 | E | 71 | 60 | 201 |

It is considered that the value of K varied by the influence of the rotational viscosity of the main shaft (the tightening between the main shaft and the housing and a viscous action due to an oil film and the like). While taking the above results into account, various cutting tests were conducted. As a result, it was found that if constant K is 250 and the moment of inertia I of the main shaft satisfies the relationship of the following Mathematical Expression 5 based on the above Mathematical Expression 4, then the rotational variation of the gear caused by cutting was eliminated.

$I \geq F \times (D/2)/[1000 \times 250 \times (N/60)^2]$     [Mathematical Expression 5]

3. Test Using the Circular Saw Cutting Machine A

Figure 5:
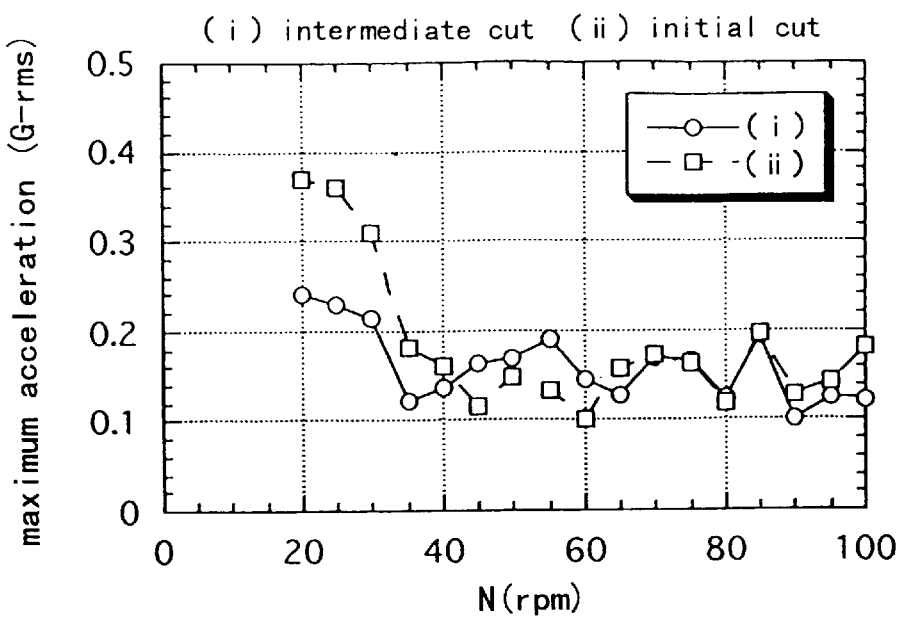
FIG. 5 is a graph showing the relationship between the number of revolution of a main shaft and the maximum acceleration of the main body of the machine in the feed direction while cutting a work material if no flywheel is attached to the circular saw cutting machine A.
Figure 6:
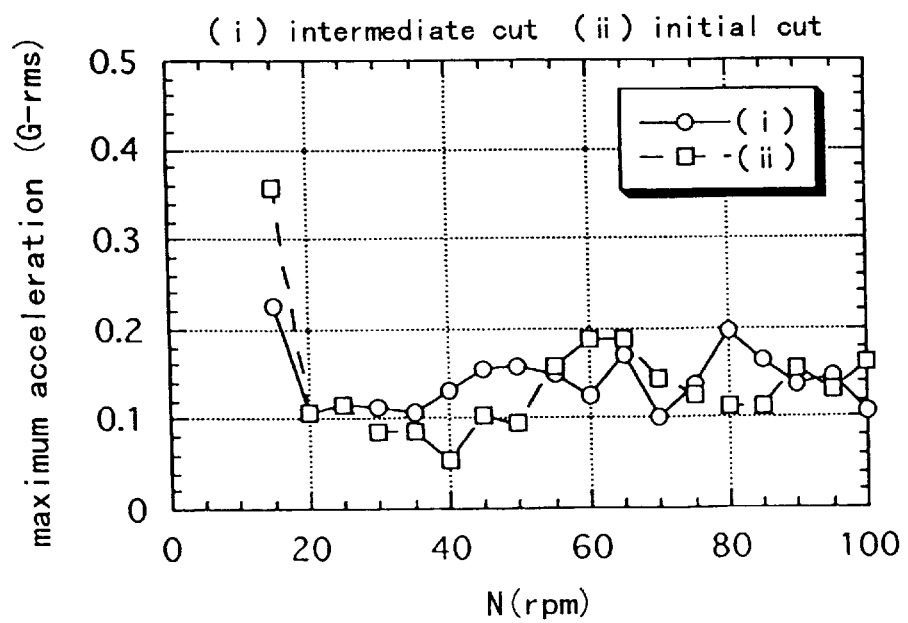
FIG. 6 is a graph showing the relationship between the number of revolution of the main shaft and the maximum acceleration of the main body of the machine in the feed direction while cutting the work material if a flywheel is attached to the circular saw cutting machine A (condition 1).

The results of a cutting test in a case where if the effect of the flywheel shown in the condition 2 of Table 1 was small (if no flywheel was attached) and that in a case where the flywheel 29 was attached to the main shaft 23 to thereby increase the effect of the flywheel 29 while using the circular saw cutting machine A, were shown in FIGS. 5 and 6, respectively. It is noted that FIGS. 5 and 6 illustrate the relationship between the number of revolution N (rpm) of the main shaft 23 and the maximum acceleration G-rms.

As is obvious from FIG. 5, if the effect of the flywheel was small, the number of revolution N was not more than 35 rpm and chatter vibration caused by backlash at the start of the cutting operation was generated. On the other hand, if the effect of the flywheel was large, as shown in FIG. 6, no chatter vibration caused by backlash at the start of the cutting operation was generated unless N is not more than 15 rpm.

4. Test Using the Circular Saw Cutting Machine B

Figure 7:
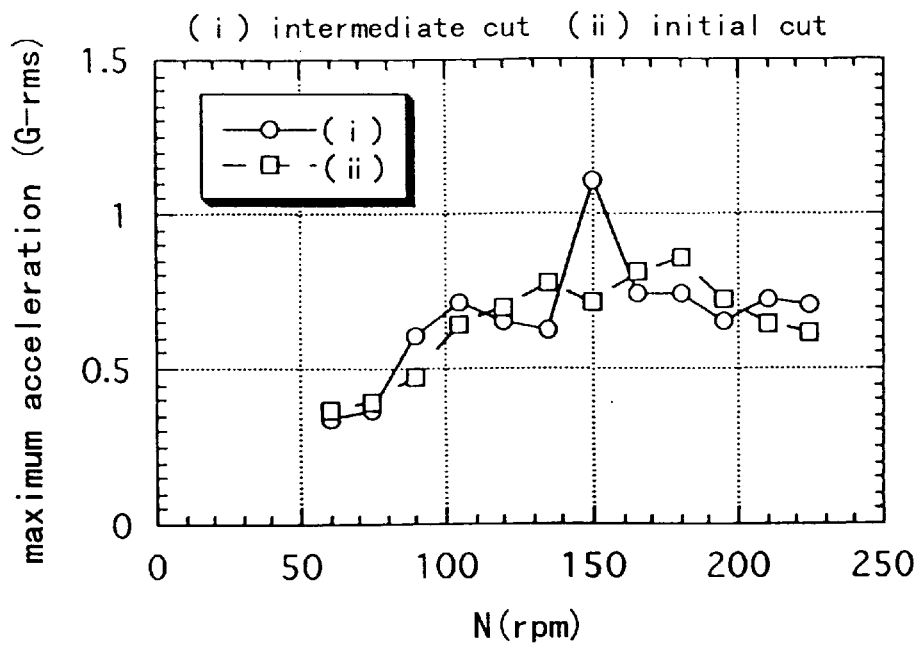
FIG. 7 is a graph showing the relationship between the number of revolution of the main shaft and the maximum acceleration of the main body of the machine in the feed direction while cutting the work material if no flywheel is attached to the circular saw cutting machine B.
Figure 8:
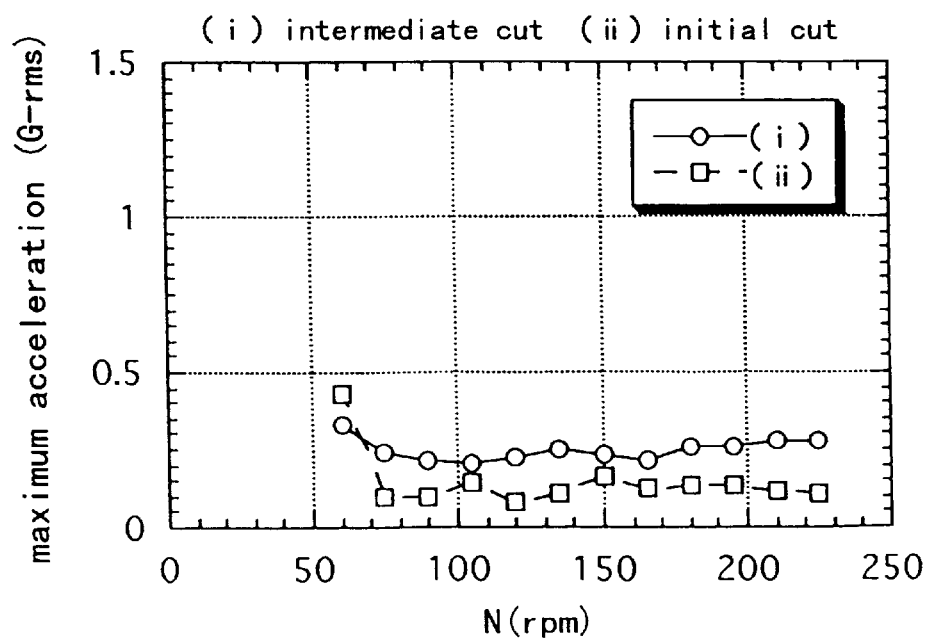
FIG. 8 is a graph showing the relationship between the number of revolution of the main shaft and the maximum acceleration of the main body of the machine in the feed direction while cutting the work material if a flywheel is attached to the circular saw cutting machine B (condition 6).

The results of a cutting test in a case where no flywheel was attached (and no extension portion of the main shaft was provided) and that in a case where the main shaft 57 was extended and the flywheel 59 was attached to the tip end of the extension as indicated by the condition 6 of Table 1 while using the circular saw cutting machine B are shown in FIGS. 7 and 8, respectively. FIGS. 7 and 8 illustrate the relationship between the number of revolution of the main shaft and the maximum acceleration.

As shown in FIG. 7, if there was no flywheel effect, a cutting vibration increased not only at the initial and final cut positions but also the intermediate cut positions. On the other hand, under the condition 6 under which the effect of the flywheel was large, chatter vibration caused by the backlash of the gears was generated at the initial cut positions if the number of revolution N was not more than 60 rpm as shown in FIG. 8. If the number of revolution was not less than 75 rpm, a cutting vibration greatly decreased not only at the initial cut positions but also the intermediate cut positions. The value of the constant K at this moment was 198.

Figure 9:
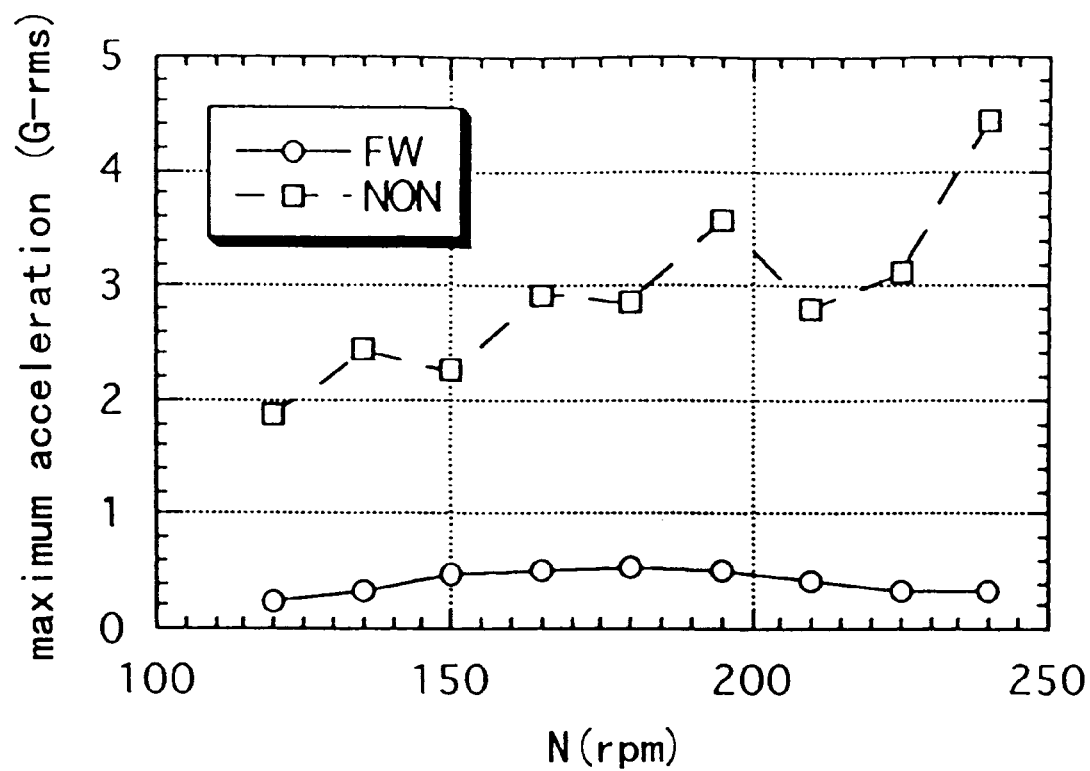
FIG. 9 is a graph showing the relationship between the number of revolution of the main shaft and the maximum acceleration while cutting the work material with the circular saw cutting machine B having large cutting variation.

5. Cutting Test for a Pipe Material Having a Large Cutting Power Vibration Using the Circular Saw Cutting Machine B Description will be given to the results of a cutting test of cutting, as work material, a pipe material STKM13A of ⌀45 mm×t5 mm having a large cutting variation under the cutting condition of SZ=0.08 mm per tooth in a case of the condition 6 under which the flywheel 59 was attached to the main shaft 57 and a case where no flywheel was attached while using the circular saw cutting machine B, using, as a circular saw, the above-stated circular saw D. As shown in FIG. 9, a cutting vibration was extremely low if the flywheel was attached (solid line) compared with a case where no flywheel was attached (dotted line). Also, as a result of conducting the same test under the condition 7, the effect of the flywheel was confirmed although not shown in the drawing.

Figure 10:
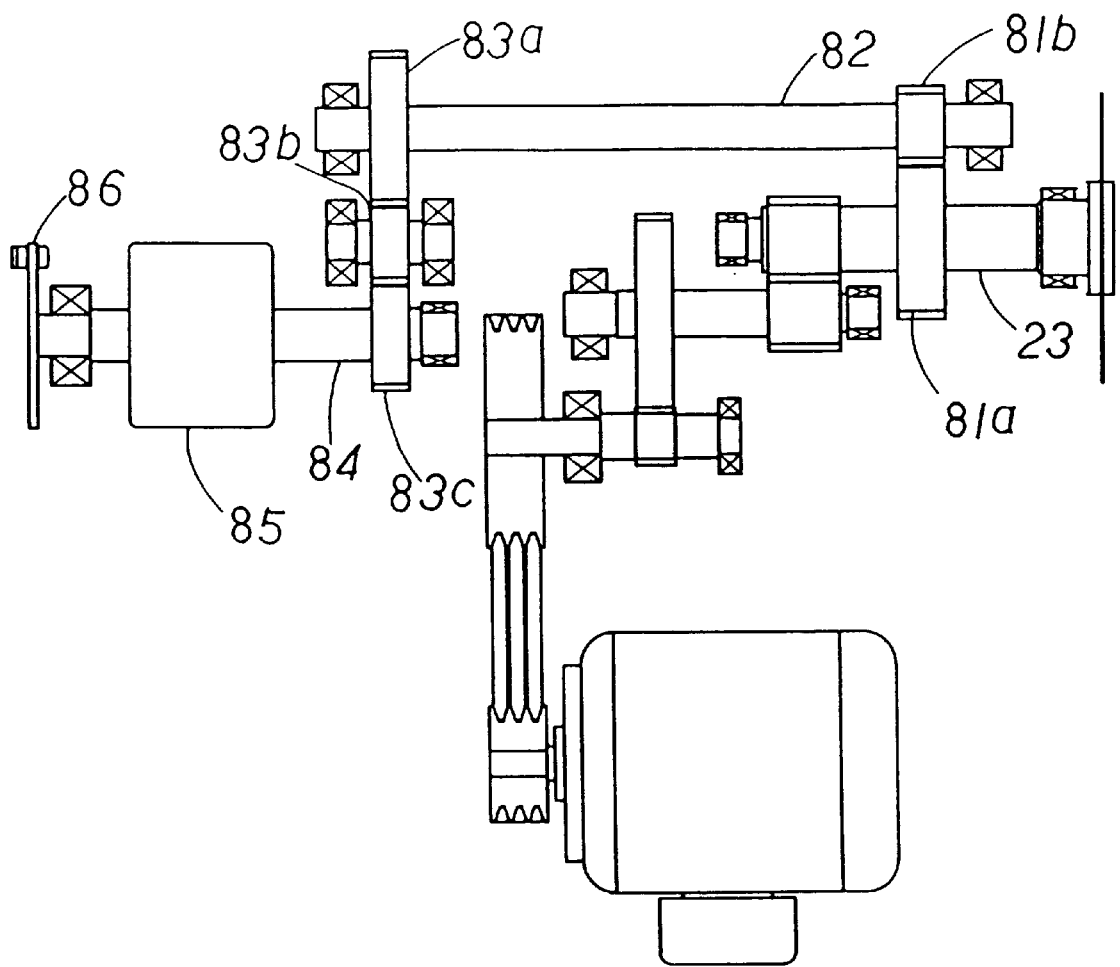
FIG. 10 is an explanatory view for a constitution in which a flywheel is attached to the driven shaft of the circular saw cutting machine A.

6. Cutting Test if a Flywheel was Attached to a Driven Shaft of the Circular Saw Cutting Machine A As shown in FIG. 10, in the circular saw cutting machine A, a driven shaft 82 coupled to the main shaft 23 through gears 81a and 81b was provided. A flywheel 85 and a braking device 86 were attached to a final driven shaft 84 coupled to the driven shaft 82 through gears 83a, 83b and 83c. With this constitution, the backlash of gears between the main shaft 23 and the driven shaft 82 and that between the main shaft and the driven shaft 84 were eliminated. The moment of inertia of main shaft conversion of the driven shaft systems was 0.0320 kgf·m·sec$^2$ and that of the drive system with backlash between the main shafts eliminated was 0.0305 kgf·m·sec². In this example, since the V-shaped belt was not rigid, the moment of inertia of the output shaft was not included in the moment of main shaft conversion.

A test of cutting a work material S45C of ⌀70 mm under the cutting condition of SZ=0.07 mm per tooth was conducted while using this circular saw cutting machine A and using, as a circular saw, the circular saw D. As a result, if N was not more than 55 rpm, chatter vibration caused by backlash was generated at the initial and final cut positions. If N was not less than 60 rpm, chatter vibration caused by backlash was not generated.

If the K was calculated for the smaller one (0.0320) of the two moments of inertia, K was 213 and the moment of inertia satisfied the relationship of the above Mathematical Expression 5. This was coincided with the test result.

Figure 11A:
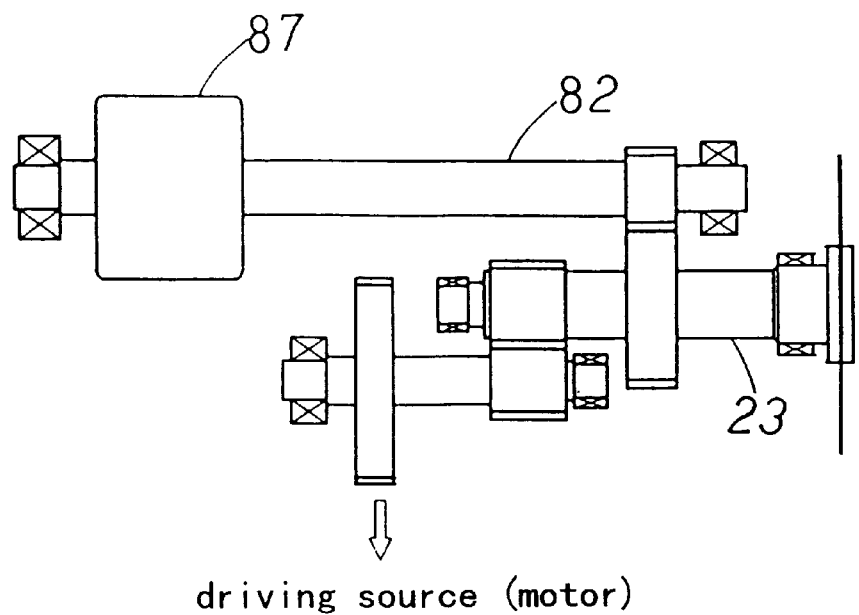
FIGS. 11A and 11B are explanatory views for another constitutions in which a flywheel is attached to the driven shaft of the circular saw cutting machine A.
Figure 11B:
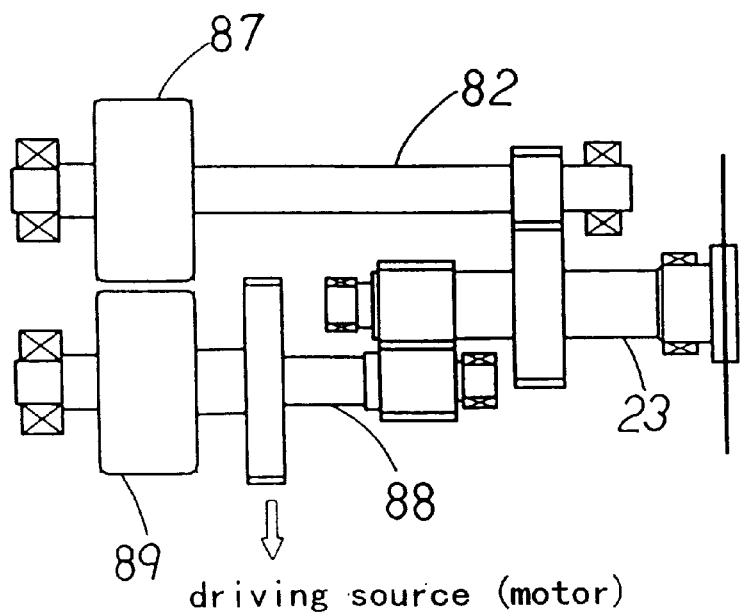

As an example of attaching a flywheel to the driven wheel, as shown in FIG. 11 in addition to FIG. 10, the flywheel 87 can be attached to the driven shaft 82. FIG. 11B shows an example of also attaching a flywheel 89 to a drive shaft 88 at the main shaft 23 side.

It is noted that if the circular saw has special shape teeth and the cutting force F varies according to the saw tooth, the maximum value is used as the force F. In an actual design phase, the value of the cutting force F is based on the service life of the saw. Further, if the diameter of the saw varies, the maximum diameter is used as D.

According to the present invention, the moment of inertia is the same as that shown in the Mathematical Expression 5. The higher the moment of inertia, the more effective for preventing chatter vibration. However, if a heavier flywheel is used or the like so as to increase the moment of inertia, there are cases where it is necessary to enhance the rigidity of the cutting machine and the cutting machine puts on too much weight. In view of this, it is desirable to add the condition of the following Mathematical Expression 6 besides following the Mathematical Expression 5 so as not to make the moment of inertia too high. Needless to say, in calculation of the moments of inertia of the respective rotary shafts, the pulleys, gears, electric motor and the like besides the shafts themselves should be taken into account.

$$I \leq 3\{F \times (D/2)/[1000 \times 250 \times (N/60)^2]\}$$ [Mathematical Expression 6]

It is noted that the present invention is also applicable to the above examples 1 to 5 if a braking device is attached to a driven shaft. The concrete constitution of the circular saw cutting machine should not be limited to those of the machines A and B.

II. Embodiment 2

Figure 12:
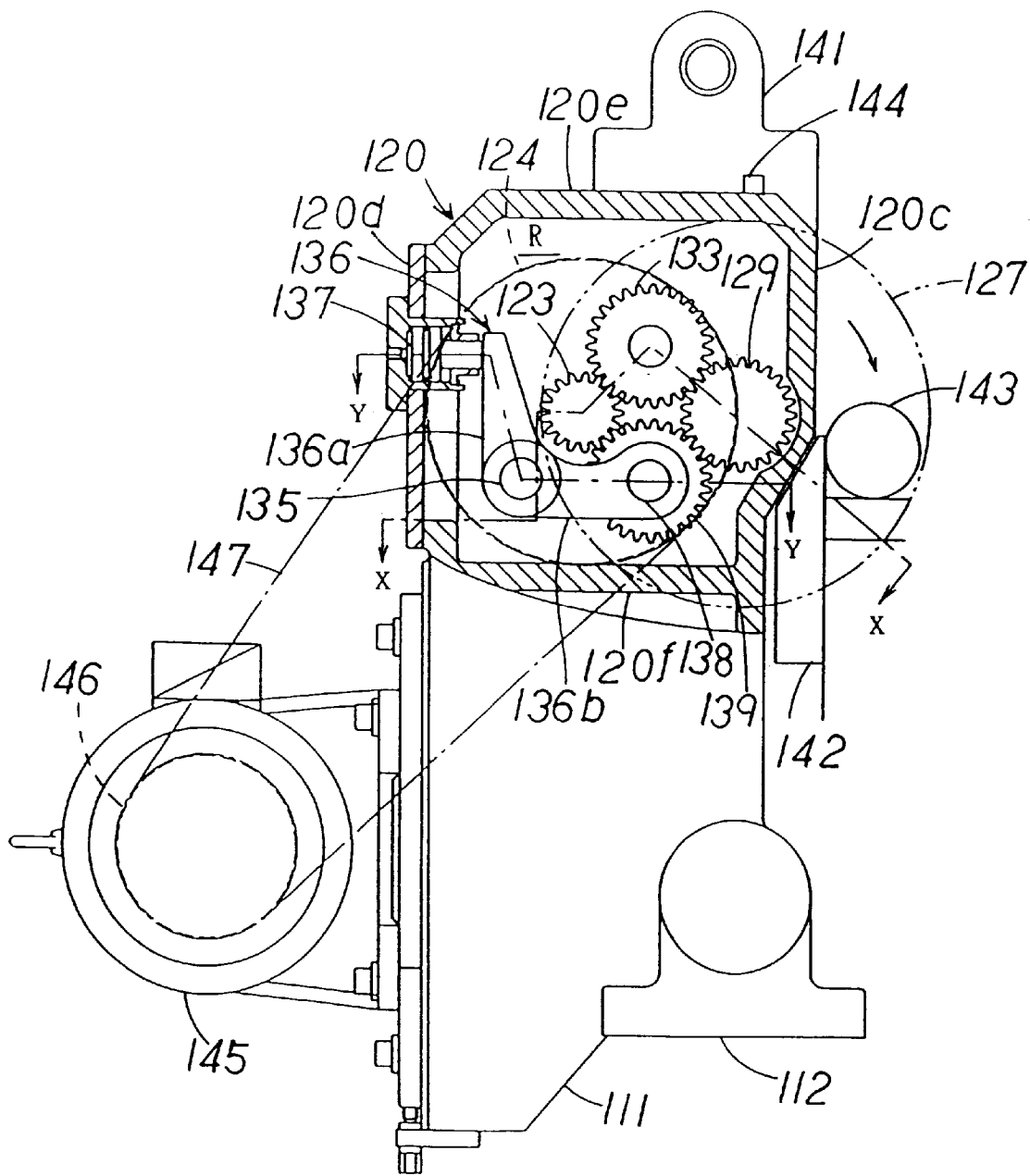
FIG. 12 is a partially broken front view showing a swing-type circular saw cutting machine as the second embodiment.
Figure 13:
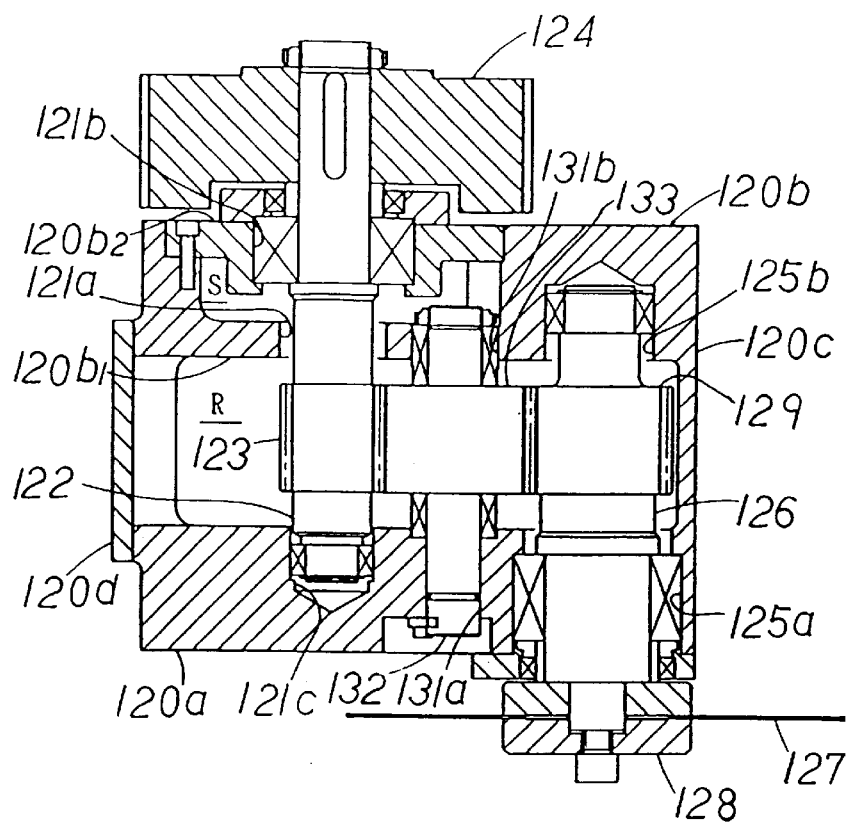
FIG. 13 is a cross-sectional view taken along line X—X of FIG. 12.
Figure 14:
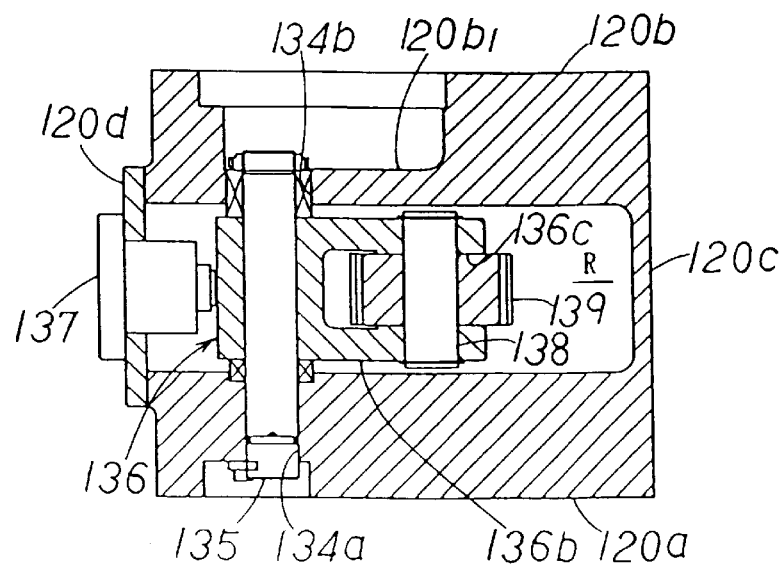
FIG. 14 is a cross-sectional view taken along line Y—Y of FIG. 12.

Next, the second embodiment according to the present invention will be described based on the drawings. FIGS. 12 to 14 show a swing-type circular saw cutting machine in this embodiment as a partially broken front view, a cross-sectional view (taken along line X—X of FIG. 12) and a cross-sectional view (taken along line Y—Y of FIG. 12), respectively. This circular saw cutting machine is provided with a box-shaped machine base 111. The machine base 111 is rotatably supported by a support base 112 at a lower right position. A box-shaped gear box 120 is fixedly disposed at the upper portion of the machine base 111. The gear box 120 is a hollow shape surrounded by a front sidewall 120a, a rear sidewall 120b, a right sidewall 120c, a left sidewall 120d, an upper surface wall 120e and a bottom wall 120f and the interior of the gear box 120 is a working room R filled with lubricating oil (note, the crosswise direction will hereinafter mean a direction seen from the front of the machine base 111). The rear sidewall 120b is provided with a space section S extending from the left end to generally intermediate position of the sidewall 120b as shown in FIG. 13. In this portion of the sidewall 120b, a front wall portion 120b1 and rear wall portion 120b2 are provided across the space section Through holes 121a and 121b penetrating the front wall section 120b1 and the rear wall section 120b2, respectively, in longitudinal direction are formed at the center positions off the left of the gear box 120. An attachment hole 121c is provided on the back surface of the front sidewall 120a at the extended position of the through holes 121a and 121b. A drive shaft 122 penetrate the through holes 121a, 121b and the attachment hole 121c and is supported by the through hole 121a and the attachment hole 121c through a bearing so as to be rotatable and not to be axially movable. One end of the drive shaft 122 protrudes outward from the rear sidewall 120b. A pulley 124 is fixed to the protruded portion of the drive shaft 122. A drive shaft gear 123 is fixed to a portion of the drive shaft 122 within the working room R.

A through hole 125a penetrating the front sidewall 120a in longitudinal direction is formed at a position in the vicinity of the right sidewall 120c of the gear box 120 and an attachment hole 125b is formed in the front surface of the rear sidewall 120b. A main shaft 126 is supported by the through hole 125a and the attachment hole 125b through a bearing so as to be rotatable and not to be axially movable. One end of the main shaft 126 slightly protrudes forward from the front sidewall 120a and a circular saw 127 is fixed to the protruded portion of the main shaft 126 and put between flanges 128. A main shaft gear 129 is fixed to a portion of the main shaft 126 within the working room R.

A through hole 131a penetrating the front sidewall 120a and a throughhole 131b penetrating the front wall section 120b1 of the rear sidewall 120b are formed in longitudinal direction at the intermediate positions of the drive shaft 122 and the main shaft 126 within the gear box 120. An intermediate shaft 132 is supported by the through holes 131a and 131b through a bearing so as to be rotatable and not to be axially movable. An intermediate gear 133 is fixed to the intermediate shaft 132. The intermediate gear 133 is engaged with the drive shaft gear 123 and with the main shaft gear 129 and is used to transmit power from the drive shaft 122 to the main shaft 126.

As shown in FIG. 14, a through hole 134a penetrating the front sidewall 120a and a through hole 134b penetrating the front wall section 120b1 of the rear sidewall 120b are formed in longitudinal direction at the lower left positions of the drive shaft 122 within the gear box 120. A support shaft 135 is supported by the through holes 134a and 134b through a bearing so as to be rotatable and not to be axially movable. A swing arm 136 is fixed to the support shaft 135 as shown in FIG. 12. The swing arm 136 is a generally L-shaped arm if seen from the front and a cross portion between the vertical section 136a and the horizontal section 136b of the L-shaped arm 136 is fixed to the support shaft 135.

The upper end of the vertical section 136a of the swing arm 136 is coupled to the tip end of a hydraulic cylinder 137 provided to penetrate generally the vertically intermediate position of the left sidewall 120d, and to be rotatable about the support shaft 135 by driving the hydraulic cylinder 137. As shown in FIG. 14, the intermediate portion of the horizontal section 136b of the swing arm 136 in longitudinal direction is formed into a depressed portion 136c notched from the right end and the support shaft 138 is supported by the right end position of the horizontal section 136*b* so as to be rotatable and not to be axially movable. An intermediate gear 139 is fixed to the support shaft 138 at the position of the depressed portion. 136*c* and disposed so as to be engageable with the drive shaft gear 123 and with the main shaft gear 129. The drive shaft gear 123 is one of the intermediate gears. The intermediate gear 139, the drive shaft gear 123, the main shaft gear 129 and the intermediate gear 133 form a loop and constitute a confining engagement gear string which engageably rotate simultaneously. Among them, the intermediate gear 139 is used to eliminate the backlash of the confining engagement gear string. That is, the depth of engagement of the intermediate gear 139 with the drive shaft gear 123 and the main shaft gear 129 is controlled according to the angle of the swing arm 136 rotated about the support shaft 135 by driving the hydraulic cylinder 137.

In the rotation direction shown in this embodiment (arrow direction in FIG. 12), the swing arm 136 is rotated and the center of the shaft of the intermediate gear 139 is shifted to be away from the other gears, whereby these gears are forcedly contacted with one another, the backlash of the overall gear string is entirely eliminated and a necessary pressure force is applied to the gears so as to suppress chatter vibration. Furthermore, the pressure force can be easily regulated by a pressure regulation valve (not shown) provided within the hydraulic circuit and is allowed to be applied by a switching valve only when the pressure force is necessary. This makes it possible to suppress wasteful power consumption and the wearing of the gears and to maintain the backlash free even if the gears are increasingly worn following the long-time use of the machine. Furthermore, even if the gears are eccentric or there are errors in the shapes of the gears, these eccentricity and errors are absorbed by the extension of the hydraulic cylinder 137. Thus, no excessive load acts on the gear surfaces and bearings. Moreover, since it is not necessary to use highly accurate gears, the cutting machine can be manufactured at low cost. It is noted that if rotation direction is opposite, the moving direction of the intermediate gear 139 is shifted to a direction in which the intermediate gear 139 is closer to the other gears, thereby making it possible to eliminate the backlash of the overall gear string.

An attachment section 141 is provided on the upper surface wall 120*e* of the gearbox 120. The tip end of the rod of a hydraulic cylinder (not shown) fixed to another position on the right of the circular saw cutting machine, is fixed to the attachment section 141. The gear box 120 is pushed by the extension of the rod of the hydraulic cylinder and rotated about the support base 112. A cutting base 142 for attaching the work material 143 is provided in the vicinity of the lower end of the right sidewall 120*c* of the gear box 120. An acceleration sensor 144 is attached to the right of the front end of the upper surface wall 120*e* of the gear box 120 and used to detect the acceleration of the gear box 120 in the feed direction in the vicinity of the circular saw 127.

An electric motor 145 is attached to the lower left portion of the machine base 111. A pulley 146 is fixed to a shaft of the electric motor 145 which shaft protrudes to the back surface of the motor 145. A belt 147 is wound around the pulleys 146 and 124. With this, the reduced rotation of the electric motor 145 is transmitted to the main shaft 126 through the drive shaft 122 and the intermediate shaft 132 to thereby rotate the circular saw 127. The gear box 120 is filled with lubricating oil, which oil circulates within the working room R.

(1) Cutting test

Next, a test was conducted for the effect of suppressing chatter vibration at the initial cutting operation if the work material 143 was cut by the circular saw 127 while changing the moment of inertia of the pulley 124 attached to the drive shaft 122 three kinds (by adding a flywheel to the pulley). In this test, a load applied to the intermediate gear 139 by the hydraulic cylinder 137 was set at 150 kgf. The changed moments of inertia of the pulley 124 (P1 to P3) are shown in Table 2 below.

TABLE 2 the moment of inertia of the pulley P attached to the drive shaft

| pulley No | moment of inertia of pulley itself kgf · m · s² | ratio of reduced speed i | moment of inertia of main shaft conversion kgf · m · s² |
|---|---|---|---|
| P1 | 0.00854 | 1.47 | 0.01845 |
| P2 | 0.01356 | 1.47 | 0.0293 |
| P3 | 0.01994 | 1.47 | 0.0431 |

The moment of inertia of main shaft conversion of a common component other than the pulley 124 is shown in Table 3 below.

Table 3

The moment of inertia of main shaft conversion of a common component

| component | ratio of reduced speed i | moment of inertia of main shaft conversion kgf · m · s² |
|---|---|---|
| drive shaft gearA + drive shaft | 1.47 | 0.0002 |
| intermediate gearB | 0.926 | 0.0002 |
| intermediate gearC | 0.926 | 0.0001 |
| main shaft gearD | 1 | 0.0002 |
| flange | 1 | 0.0004 |
| main shaft | 1 | 0.0002 |
| circular saw | 1 | 0.0008 |
| total | | 0.0021 |

The overall moment of inertia Js of main shaft conversion obtained from a combination of the respective pulleys (P1 to P3) and the common component is shown in Table 4 below.

TABLE 4

The overall moment of inertia of main shaft conversion obtained from a combination of the pully and the common component

| pulley No | total moment of inertia of main shaft conversion Js kgf · m · s² |
|---|---|
| P1 | 0.0206 |
| P2 | 0.0314 |
| P3 | 0.0452 |

(2) Test method

The circular saw having an outside diameter of ø280 mm, a thickness T of 2.0 mm, a thickness t of a base metal of 1.7 mm and the number of saw teeth of 60, was fixed to the main shaft 126 by the flange of a diameter of ø106 mm. A work material was chromium-molybdenum steel SCM440H having a diameter of ø60 mm and a hardness HRC of 30. As cutting conditions, a feed speed per tooth Sz was set constantly at 0.08 mm at the number of revolution of $N \leq 130$ rpm and a circular saw feed speed f was set at 624 mm/min at the number of revolution N exceeding 130 rpm. In this test, the measured lowest number of revolution Ncr at which no chatter vibration occurs at the initial cutting operation when working the present invention and the calculation Ncr calculated by the above Mathematical Expression 4 (K=250) are shown in Table 5 below. In the actual measurement, although it was observed whether or not chatter vibration was generated at intervals of the number of revolution of 10 rpm, the amplitude of the chatter vibration was not so high. Due to this, whether chatter vibration was generated at the initial cutting operation was judged from the gradient of the rise of the effective value of acceleration recorded by a pen recorder. It is noted that mechanical vibrations, such as an impact vibration (which does not follow the rotational variation corresponding to the backlash of gears) when the saw tooth is bit into the work material, other than the chatter vibration followed by the rotational variation corresponding to the backlash of gears were constantly generated during the rotation of the saw.

Table 5

The measured lowest number of revolution Ncr at which no chatter vibration occurs at the initial cutting operation

| pulley | measurement Ncr(rpm) | F(kg) | calculation Ncr(rpm) |
| --- | --- | --- | --- |
| P1 | more than60, not more than70 | 63.6(N = 80) | 78.9 |
| P2 | more than50, not more than60 | 67.6(N = 65) | 65.9 |
| P3 | more than50, not more than60 | 71.7(N = 55) | 56.6 |

(3) Test result

Figure 15:
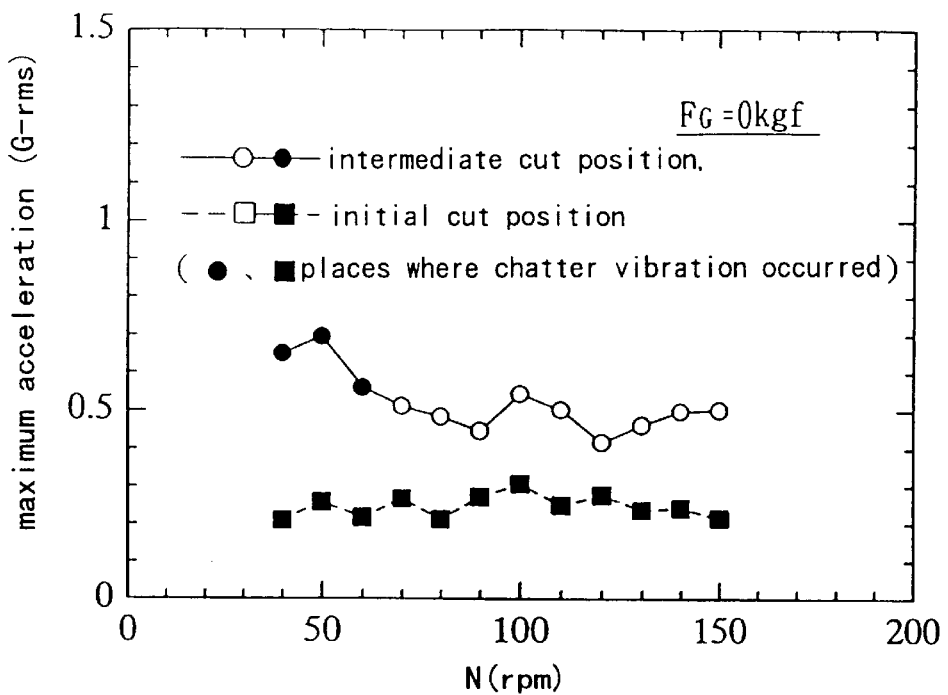
FIG. 15 is a graph showing the relationship between the number of revolution N of a circular saw and the maximum acceleration (G-rms) of the vibration of a machine main body in a case where the load of a hydraulic cylinder is not applied to the intermediate gear of the circular saw cutting machine (pulley P3).
Figure 16:
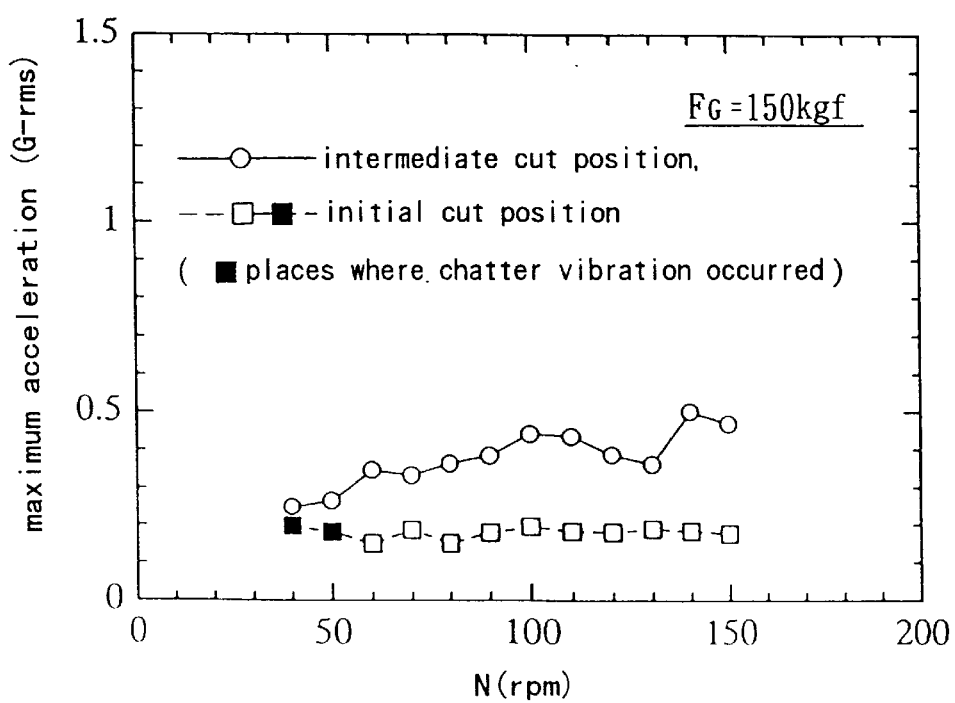
FIG. 16 is a graph showing the relationship between the number of revolution N of the circular saw and the maximum acceleration (G-rms) of the vibration of the machine main body in a case where the load of a hydraulic cylinder is applied to the intermediate gear of the circular saw cutting machine (pulley P3).

From the test result, the measured value Ncr was slightly lower than the calculation value Ncr when the moment of inertia was low and that the measured value Ncr was almost equal to the calculation value Ncr when the moment of inertia was high. Thus, it was confirmed that the analysis result based on the mathematical expression 4 was generally correct. Further, the relationship between the number of revolution N of the circular saw and the maximum acceleration (G-rms)of the vibration in case of the pulley P3 is shown in FIGS. 15 and 16. They indicate that the higher the acceleration, the higher the vibration level of the machine main body. FIG. 15 shows a case where a load $F_G$ of the hydraulic cylinder 137 does not act on the intermediate gear 139 ($F_G$=0). However, the loads of self-weights of the intermediate gear 139 and the swing arm 136 act on the gear 139. FIG. 16 shows a case where a load $F_G$=150 kgf of the hydraulic cylinder 137 acts on the intermediate gear 139.

As is obvious from FIG. 16, if backlash is eliminated by applying a load to the intermediate gear 139, a chatter vibration at the initial cutting operation with the number of revolution of not less than the lowest number is eliminated and also a regenerated or coupled chatter vibration at positions other than the initial cut positions (intermediate cut positions having the number of cutting related teeth Zi exceeding 1) or particularly in a low frequency region was eliminated quite effectively, in addition to the effect of the chatter vibration eliminated by the increase of the moment of inertia. As can be seen from FIG. 12, however, even if no load is applied to the intermediate gear 139, a vibration suppression effect is generated at the initial cut positions as shown in FIG. 15 by a load slightly acting on the intermediate gear 139 due to the influence of gravitation and by the viscous action of the lubricating oil filled in the working room R of the gear box 120. Since the number of revolution of the drive shaft 122 is higher than that of the main shaft 126, the diameter of the flywheel attached to the pulley 124 can be reduced compared with a system in which the flywheel is directly coupled to the main shaft 126. In addition, since the flywheel is not disposed on the main shaft 126, it is possible to prevent the wheel and the work material from interfering with each other. Further, the effect of reducing the weight of the machine can be obtained.

In the above-state embodiment, if the saw has special shape teeth and the cutting force F varies according to the tooth, the maximum cutting force F is used as the force F. Also, in an actual design phase, the value of the cutting force F is based on the service life of the saw. If the diameter of the saw changes, the maximum diameter is used as the outside diameter D. Further, it is possible that any one of the intermediate gears serves as a drive shaft gear and that the flywheel is attached to any one of the intermediate gear shafts. A confining engagement gear string having five or more intermediate gears may also be used. It is noted, however, the string having seven or more gears is not practical in view of attachment space, cost and the like.

In the present invention, the moment of inertial J of main shaft conversion is the same as that shown in the Mathematical Expression 5 (I is replaced by J). As the moment of inertia is higher, chatter vibration can be prevented more effectively. If the flywheel is made heavier or the like so as to increase the moment of inertia, there are cases where it is required to increase the rigidity of the cutting machine and the cutting machine puts on too much weight. Therefore, to prevent the moment of inertia from excessively increasing, it is desirable to not only follow the Mathematical Expression 5 but also add the condition of the Mathematical Expression 6. Needless to say, in calculation of the moments of inertia of main shaft conversion of the respective shafts, the pulleys, gears, electric motor and the like besides the shaft themselves should be taken into account.

It is considered that in the system for transmitting power from the motor shaft to the drive shaft by means of the belt, backlash substantially exists since the belt is elastic. The concrete constitution of the circular saw cutting machine should not be limited to those described above. The present invention is also applicable to a slide-type circular saw cutting machine in addition to the above-stated swing-type cutting machine.

INDUSTRIAL APPLICABILITY

The circular saw cutting machine of the present invention is usable to protect the occurrence of a chatter vibration in cutting of a metallic work material and is suitable to eliminate the chatter vibration of a circular saw under cutting operation, to enhance cutting accuracy and to prolong the service life of the circular saw and to reduce the noise at low cost.

We claim:

1. A circular saw cutting machine for transmitting the rotation of an electric motor to a main shaft and for cutting a work material by using a circular saw attached to one end of the main shaft, characterized in that a confining engagement gear string is constituted by arranging three or more odd-numbered intermediate gears forming a loop with a main shaft gear fixed to said main shaft, engaged with one another and simultaneously rotated, the rotation of the electric motor is transmitted to one of the intermediate gears, at least one of the intermediate gears is movable and a load is applied to at least one of the movable intermediate gears, thereby eliminating a backlash of the confining engagement gear string; and if an outside diameter of said circular saw is D (mm), the number of revolution is N (rpm) and a cutting force per tooth as a component of force in tangential direction is F (kgf), a sum J of moments of inertia (kgf·m·sec$^2$) of main shaft conversion of respective shafts including the main shaft, the respective shafts cooperated with one another in a state in which a backlash is eliminated from said main shaft, is set at $J \geq F \times (D/2)/[1000 \times 250 \times (N/60)^2]$.

2. A circular saw cutting machine for transmitting the rotation of an electric motor to a main shaft and for cutting a work material by using a circular saw attached to one end of the main shaft, characterized in that if an outside diameter of said circular saw is D (mm), the number of revolution is N (rpm) and a cutting force per tooth as a component of force in tangential direction is F (kgf), a moment of inertia I (kgf·m·sec$^2$) of said main shaft is set at $I \geq F \times (D/2)/[1000 \times 250 \times (N/60)^2]$.

3. A circular saw cutting machine for transmitting the rotation of an electric motor to a main shaft and for cutting a work material by using a circular saw attached to one end of the main shaft, characterized in that a flywheel is attached either directly to said shaft or to a shaft extended from the main shaft; and if an outside diameter of said circular saw is D (mm) the number of revolution is N (rpm) and a cutting force per tooth as a component of force in tangential direction is F (kgf), a moment of inertia I (kgf·m·sec$^2$) of said overall main shaft including said flywheel is set at $I \geq F \times (D/2)/[1000 \times 250 \times (N/60)^2]$.

4. A circular saw cutting machine for transmitting the rotation of an electric motor to a main shaft and for cutting a work material by using a circular saw attached to one end of the main shaft, characterized in that if an outside diameter of said circular saw is D (mm), the number of revolution is N (rpm) and a cutting force per tooth as a component of force in tangential direction is F (kgf), a sum J of moments of inertia (kgf·m·sec$^2$) of main shaft conversion of respective shafts including the main shaft, the respective shafts cooperated with one another in a sate in which a backlash is eliminated from said main shaft is set at $J \geq F \times (D/2)/[1000 \times 250 \times (N/60)^2]$.

* * * * *